(No Model.)

N. H. DAVIS.
AXLE BOX LID.

No. 521,207. Patented June 12, 1894.

Witnesses:
Jesse B. Heller.
Edw. F. Ayres.

Inventor.
Nathan H. Davis
Francis T. Chambers
his Attorney.

THE NATIONAL LITHOGRAPHING COMPANY,
WASHINGTON, D. C.

UNITED STATES PATENT OFFICE.

NATHAN H. DAVIS, OF PHILADELPHIA, PENNSYLVANIA.

AXLE-BOX LID.

SPECIFICATION forming part of Letters Patent No. 521,207, dated June 12, 1894.

Application filed August 17, 1893. Serial No. 483,317. (No model.)

*To all whom it may concern:*

Be it known that I, NATHAN H. DAVIS, a citizen of the United States, residing at Philadelphia, in the county of Philadelphia and State of Pennsylvania, have invented a certain new and useful Improvement in Axle-Box Lids, of which the following is a true and exact description, reference being had to the accompanying drawings, which form a part of this specification.

My invention relates to axle box lids, and consists primarily in forming the spring with a flange around a bolt hole punched or otherwise formed therein whereby the spring is strengthened and rendered less liable to crack across the bolt hole; and arranging this spring with an axle box lid in such a manner that the fastening bolt will bear against the spring and secure it to the face of the box and will prevent the lid from being pulled too far out and straining the spring when the lid is turned to uncover the box.

My invention will be best understood as described in connection with the accompanying drawings, which illustrate an axle box provided with my improvements, and in which—

Figure 1:
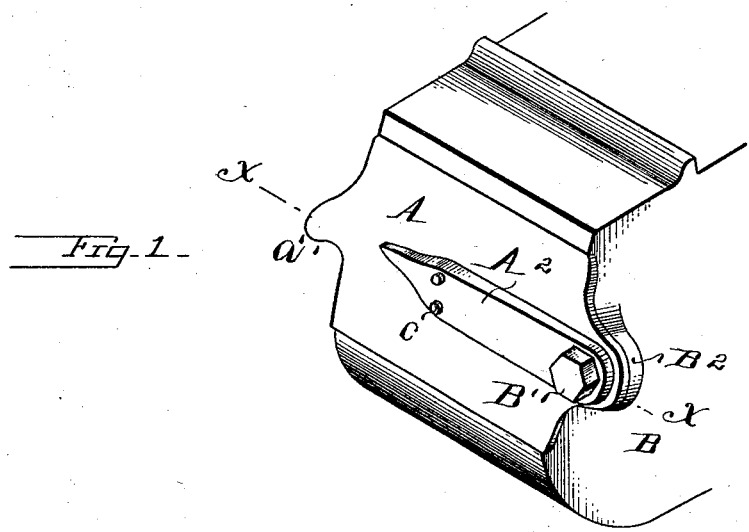
Figure 2:
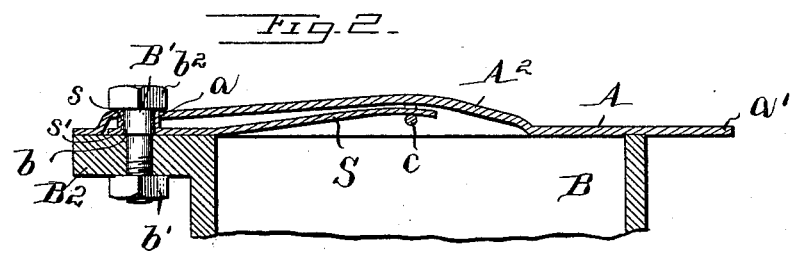
Figure 3:
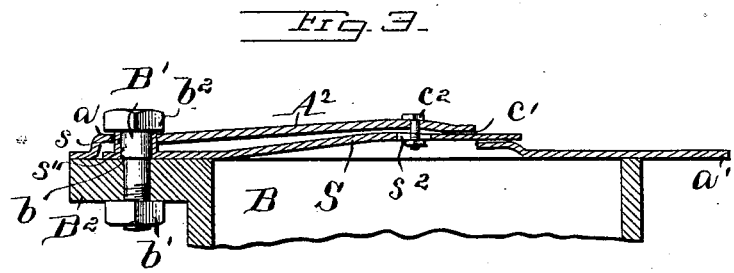

Figure 1 is a perspective view of an axle box and lid. Fig. 2 is a section on the line $x-x$ of Fig. 1. Fig. 3 is a view similar to that shown in Fig. 2 showing different means for securing the spring to the lid; and Fig. 4 is a perspective view of the spring shown in section in Figs. 2 and 3.

B is an axle box in which a car or other axle is adapted to rotate, and is provided with an extension $B^2$ for the pivotal bolt of the lid.

A is the lid formed with a pivot hole $a$ and a handle $a'$.

Figure 4:
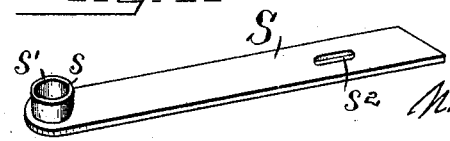

S is a spring preferably flat, as shown in Fig. 4, and is provided near one end with a hole $s'$ punched or otherwise formed therein and has around the hole $s'$ a flange $s$ which may conveniently be formed from the material of the spring when the hole $s'$ is punched through. This flange $s$ serves to strengthen the spring at a point where it would ordinarily be the weakest and prevents the crack of the spring across the hole $s'$, and is of sufficient size to pass through the hole $a$ in the lid and project slightly above it as shown in Figs. 2 and 3 so that the head $b^2$ of the bolt $B'$ will bear against the flange $s$ of the spring and not against the lid. This bolt $B'$ may also be provided with a flange $b$ to keep the head $b^2$ at a fixed distance from the box and a nut $b'$ which is adapted to secure it tightly thereto. That end of the spring in which the hole $s'$ is formed is thus secured by means of the bolt $B'$ which bears against the flange $s$ of the spring, and the other end is secured to the lid A, in order to hold it to the face of the box; this may be very conveniently done by forming a socket as $c$ by means of a cross stirrup as shown in Fig. 2 or, as shown at $c'$ in Fig. 3, by means of a slit in the portion $A^2$ of the box, or if preferred by means of a bolt $c^2$ working in an elongated slot $s^2$ in the spring, or other convenient means may be used to secure the free end of the spring to the lid. The form shown in Fig. 2 however is preferable in that no opening is made in the lid which will permit the admission of dust and dirt to the interior of the box. In uncovering the box the end $A^2$ of the lid is pulled outward and the lid rotated on the pivotal bolt $B'$, it is impossible however to pull the lid out too far and thus strain the spring because the lid will strike against the head $b^2$ of the bolt.

Having now described my invention, what I claim as new, and desire to secure by Letters Patent, is—

1. The combination with an axle box lid having a pivot hole $a$, of a spring having a hole $s'$ and a flange $s$ said flange being adapted to pass through and project above the hole $a$ in the lid, a bolt $B'$ having a head $b^2$ adapted to bear against the flange $s$ and secure one end of the spring to the face of the axle box and means for securing the other end of the spring to the lid.

2. The combination with an axle box lid having a pivot hole $a$ and a socket, of a spring having one end secured in the socket in the lid and having a hole $s'$ and a flange $s$ at the other end, said flange being adapted to pass through and project above the hole $a$ in the lid, and a bolt $B'$ adapted to bear against the flange and so secure the spring to the face of an axle box.

NATHAN H. DAVIS.

Witnesses:
JOSHUA MATLACK, Jr.,
EDW. F. AYRES.